United States Patent [19]

Seibert

[11] Patent Number: 4,564,134
[45] Date of Patent: Jan. 14, 1986

[54] PALLET STORAGE RACK

[76] Inventor: Charles Seibert, Rte. 2, Box 164, Penfield, Ill. 61862

[21] Appl. No.: 462,447

[22] Filed: Jan. 31, 1983

[51] Int. Cl.$^4$ .......................... B60R 9/00; B62D 25/20
[52] U.S. Cl. ................................. 224/42.41; 296/37.1
[58] Field of Search .................. 224/279, 42.07, 42.23, 224/42.38, 42.41, 328; 108/144, 148; 296/37.6; 414/462–466, 537; 211/117, 207; 280/760, 763, 769, 766.1, 768; 410/14, 28.1, 46, 90, 93

[56] References Cited

U.S. PATENT DOCUMENTS

| | | | |
|---|---|---|---|
| 1,202,166 | 10/1916 | Corbett | 211/117 |
| 1,247,553 | 11/1917 | Linquist et al. | 410/14 |
| 1,292,813 | 1/1919 | Landgraf | 224/42.16 |
| 1,983,767 | 12/1934 | Mueller | 224/42.2 X |
| 2,399,207 | 4/1946 | Clark | 414/465 |
| 2,607,518 | 8/1952 | Cohen | 224/42.41 |
| 3,004,769 | 10/1961 | Turner | 280/768 |
| 3,042,425 | 7/1962 | Cathey et al. | 280/768 X |
| 3,240,408 | 3/1966 | Lapansie | 224/42.41 |
| 3,554,397 | 1/1971 | Cluff | 414/463 |
| 4,221,312 | 9/1980 | Wertjes | 224/42.23 X |
| 4,386,722 | 6/1983 | Gearhart | 224/42.23 |
| 4,418,853 | 12/1983 | Shaffer | 224/42.41 |

Primary Examiner—Stephen Marcus
Assistant Examiner—Robert Petrik
Attorney, Agent, or Firm—L. Lawton Rogers, III

[57] ABSTRACT

An apparatus and method for storing pallets or freight externally of a tractor trailer truck. The pallet storage apparatus generally comprises a planar rigid support frame dimensioned for disposition under the trailer of a tractor-trailer truck against the underside thereof forward of the rear wheels and members for suspending the frame from the trailer at a selectively variable but substantially uniform distance from the underside of the trailer between a first position adjacent the underside of the trailer when it is desirable to carry pallets internally of the trailer and a second position spaced from the underside of the trailer when it is desirable to carry pallets on said support frame externally of the trailer to thereby free the space internal of the trailer for cargo.

4 Claims, 3 Drawing Figures

PALLET STORAGE RACK

BACKGROUND OF THE INVENTION

This invention relates to containers used in conjunction with conventional load-carrying vehicles and more particularly has reference to an apparatus for the storage of pallets and the like externally of a trailer of a tractor-trailer truck.

To decrease the cost of transporting freight, it is advantageous to carry freight on each segment of a trip of a load-carrying vehicle. However, freight transported on vehicles such as trucks and trailers varies considerably in density. Some freight occupies considerable volume in relation to its weight; while the same weight of some other types of freight occupies relatively little volume. It frequently occurs that the types of loads available for one segment of a trip may not match the type previously or subsequently carried on other segments.

To assist in the loading and unloading of freight, it is known to place freight on pallets or skids which can be lifted and moved by mechanical equipment such as fork-lifts. The use of such pallets provides a convenient and sturdy lifting point underneath the freight placed thereon and also allows the simultaneous maneuvering of numerous pieces of freight placed upon a single pallet.

If the freight on one segment of a trip is placed on pallets and on the next segment pallets are not used, some disposition must be made of the pallets between segments. Unfortunately, if the freight on the next segment completely fills the interior storage space of the trailer, insufficient space for the storage and transportation of the pallets may remain and the pallets may have to be left behind. The practice of abandoning pallets between segments of a trip is a costly one. Moreover, the abandoned pallets are not available for use on a subsequent segment on which palletized freight is to be carried.

It is therefore an object of the present invention to obviate these and other deficiencies in the transportation and storage of pallets.

It is another object of the present invention to provide a rack for the carriage and storage of unused pallets.

It is yet another object of the present invention to provide a pallet storage rack onto which pallets can be easily loaded and which can be secured snugly during transport.

It is still another object of the present invention to provide a storage rack for transport of freight external to a trailer or truck.

It is a further object of the present invention to provide a method by which freight may be securely fastened external to a trailer or truck.

These and other objects and advantages of the present invention will be apparent from the following figures and the detailed description of a preferred embodiment.

DETAILED DESCRIPTION OF A PREFERRED EMBODIMENT

Figure 1:
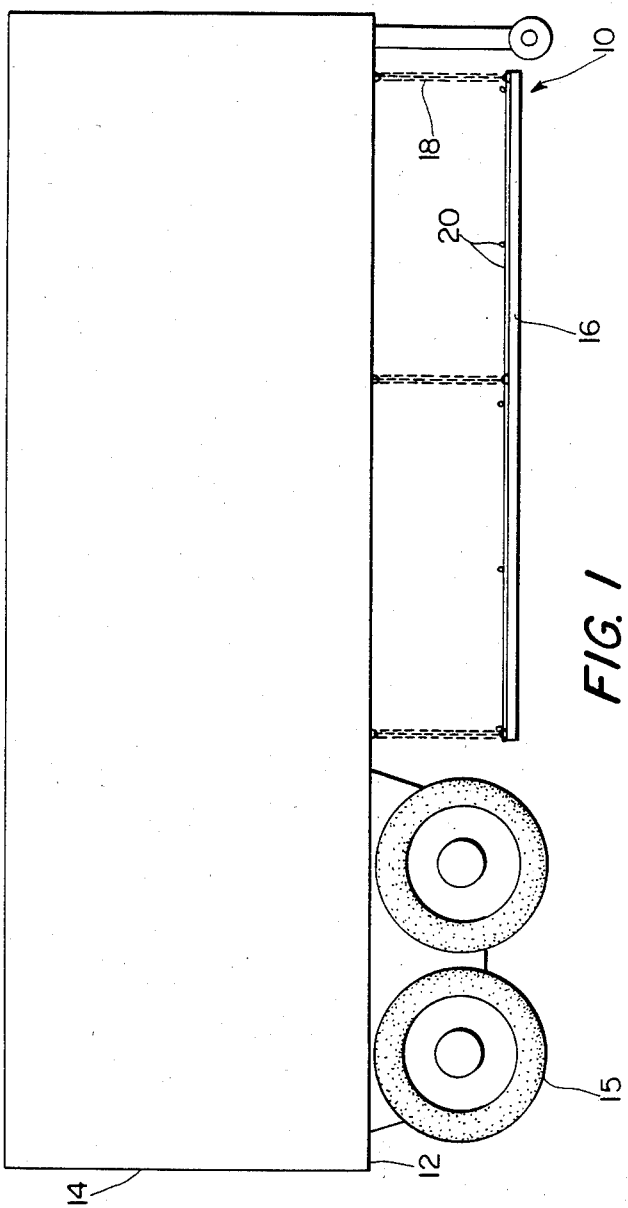
FIG. 1 is a side pictorial view of a pallet storage rack according to the preferred embodiment of the present invention mounted below the floor of a trailer.

FIG. 1 depicts a pallet storage rack 10 according to a preferred embodiment of the present invention mounted below a floor 12 of a trailer 14. The pallet storage rack 10 is comprised of a rigid support frame 16 which is attached to the floor by means of a plurality of chains or straps 18. The chains 18 are attached at one end by a conventional means such a hook or clasp to the floor 12 of the trailer 14 and on the other end to the corners of the support frame 16.

Figure 2:
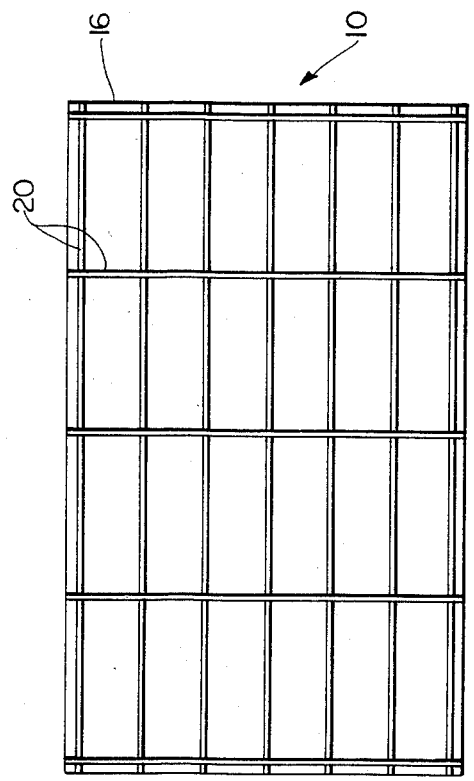
FIG. 2 is a top pictorial view of the pallet storage rack pictured in FIG. 1.

With reference to FIG. 2, which depicts a top view of the pallet storage rack 10, the support frame 16 may be comprised of a generally rectangular grid of elongated metallic elements 20, such as rods or bars, which have been fastened to each other in any conventional manner, such as by welding or gluing. The support frame 16 is sized to fit underneath the trailer, forward of the rear wheels and without lateral extension beyond the sides of the trailer.

For trailers commonly in use today in the United States, the overall dimension of the support frame 16 may be approximately 164 inches in length and 96 inches in width. Such a support frame may be comprised of longitudinal and lateral elements which have been mutually fastened into a grid. The longitudinal elements may be seven iron bars, each approximately 164 inches in length and disposed parallel to each other and at a distance of one foot from each other. The lateral elements may be five iron bars, each approximately 96 inches in length and disposed at generally right angles to the longitudinal elements at a spacing of approximately 41 inches from each of the other lateral elements. The lateral and longitudinal elements can be fastened into a generally planar grid by welding.

The operation of the pallet storage rack 10 may be explained with response to FIG. 1. In operation, the support frame 16 is suspended below the floor 12 of the trailer 14 and generally parallel to the floor 12. Pallets or other freight may be placed on the support frame 16 for transport.

The length of the chains or straps 18 attaching the support frame 16 to the floor 12 may be varied to thereby vary the vertical distance between the support frame 16 and the floor 12.

When it is desired to load freight or pallets onto the support frame 16, the length of the chains or straps 18 may be increased to permit ease of access to the support frame 16. Before transport the length of chains or straps 18 may then be shortened to secure the freight carried thereon between the support frame 16 and the floor 12.

With continued reference to FIG. 1, the chains or straps 18 are connected to, at least, the corners of the support frame 16. Additional chains or straps may be utilized intermediate the corners to assist in carrying the weight of the support frame 16 and to retain the freight carried on the support frame 16 within the bounds of the support frame 16. The additional chains or straps may be removed during loading and unloading operations to facilitate access to the support frame 16.

In a preferred embodiment, the support system for the frame 16 includes a suitable conventional wire cable and pully system which may be operated from a single winch by hand crank or electric motor to simultaneously raise all four corners of the frame.

Figure 3:
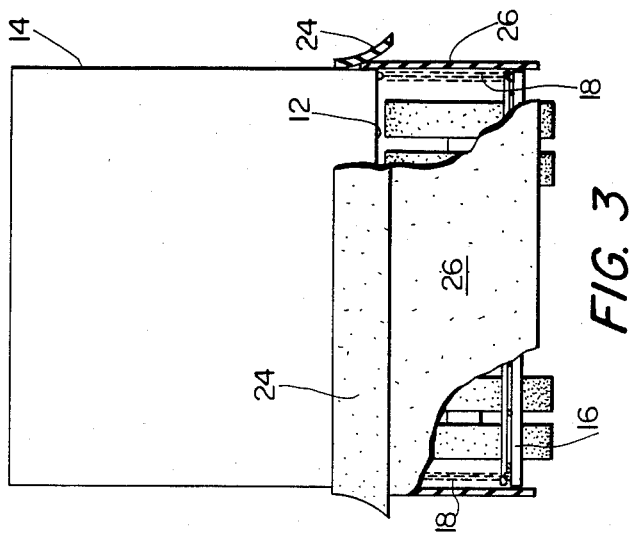
FIG. 3 is a front pictorial view of a trailer having a pallet storage rack of FIG. 1 mounted below the floor of the trailer with a water-resistant vest installed.

With reference to FIG. 3, the pallet storage rack 10 may be equipped with a water-repellant vest 26 which hangs from underneath the floor 12 of the trailer 14. The vest 26 can be comprised of any suitable water-repellant material, such as canvas, which can be fastened to the floor 12 of the trailer 14 so as to hang between the floor 12 of the trailer 14 and the support frame 16. When the vest 26 is positioned to surround the pallet storage rack 10, the freight stored on the pallet storage rack 10 is protected by the vest 26 from exposure to dirt and moisture.

With continued reference to FIG. 3, the pallet storage rack 10 may be further protected from dirt and moisture by a lip 24 which forms a water-repellant seal between the floor 12 of the trailer 14 and the top edge of the vest 26. Such lip may be formed from any flexible and durable material, such as rubber, and may be attached to the floor 12 of the trailer 14 so that the bottom of the lip 24 extends below the upper edge of the vest 26.

These and many other advantages will be apparent from the claims and it is to be understood that the foregoing is a description of a preferred embodiment, that many modifications will occur to those skilled in the art, and that the invention is limited to the language of the following claims when accorded a full range of equivalents.

What is claimed is:

1. A pallet storage rack for the trailer of a tractor-trailer truck comprising:
    a rigid support frame comprising a first plurality of elongated metallic elements disposed generally parallel to each other at spaced intervals and a second plurality of elongated metallic elements disposed generally parallel to each other and at a generally right angle to said first plurality of elements, said first and second plurality being disposed substantially coplaner and being rigidly secured to each other where adjacent, said plurality of elements being dimensioned to form a generally planar rectangular grid support frame disposed under the trailer of a tractor trailer truck against the underside thereof forward of the rear wheels without lateral extension; and
    a plurality of metal chains each connected at one end to the trailer and at the other end to said support frame and being selectively variable in effective length, said chains being at least four in number, at least four of said chains being connected to the trailer at the lateral extremeties thereof and to said support frame at the corners thereof,
    whereby the spacing between the underside of the trailer and said support frame may be relatively varied from a first position adjacent the underside of the trailer when it is desirable to carry the pallets internally of the trailer to a second position spaced approximately sixty percent of the distance between the underside of the trailer and the ground when it is desirable to carry the pallets externally of the trailer to thereby free the internal space of the trailer for cargo.

2. A pallet storage rack for the trailer of a tractor-trailer truck comprising:
    a generally planar rigid support frame dimensioned for disposition under the trailer of a tractor-trailer truck against the underside thereof forward of the rear wheels without lateral extension; and
    means for suspending said support frame from the trailer at a selectively variable but substantially uniform distance from the underside of the trailer between a first position adjacent the underside of the trailer when it is desirable to carry pallets internally of the trailer and a second position spaced from the underside of the trailer when it is desirable to carry pallets on said support frame externally of the trailer to thereby free the space internal of the trailer for cargo.

3. The storage rack of claim 2 wherein said distance is selectively variable by said suspending means sufficient to permit said support frame to rest on the ground while pallets are loaded thereon and thereafter raised until the uppermost pallet stored on said support frame is adjacent the underside of the trailer.

4. A method for securely carrying articles comprising the steps of;
    (a) providing a generally planar rigid surface;
    (b) suspending the rigid surface below the underside of a vehicle in a generally horizontal plane;
    (c) placing the articles to be carried upon the suspended rigid surface; and
    (d) raising the suspended rigid surface until the articles are held securely between the suspended rigid surface and the underside of the vehicle in a generally horizontal plane.

* * * * *